United States Patent
Balram et al.

(10) Patent No.: US 10,612,444 B2
(45) Date of Patent: Apr. 7, 2020

(54) SYSTEM AND METHOD FOR FAULT DIAGNOSIS IN EMISSION CONTROL SYSTEM

(71) Applicant: General Electric Company, Schenectady, NY (US)

(72) Inventors: Sangeeta Balram, Bangalore (IN); Sidharth Abrol, Bangalore (IN); Prem Kumar Patchaikani, Bangalore (IN)

(73) Assignee: General Electric Company, Schnectady, NY (US)

( * ) Notice: Subject to any disclaimer, the term of this patent is extended or adjusted under 35 U.S.C. 154(b) by 646 days.

(21) Appl. No.: 15/370,372

(22) Filed: Dec. 6, 2016

(65) Prior Publication Data
US 2017/0167349 A1   Jun. 15, 2017

(51) Int. Cl.
F01N 11/00 (2006.01)
B01D 53/94 (2006.01)
F01N 3/20 (2006.01)

(52) U.S. Cl.
CPC ......... F01N 11/00 (2013.01); B01D 53/9431 (2013.01); B01D 53/9495 (2013.01); F01N 3/2066 (2013.01); B01D 2251/2062 (2013.01); B01D 2257/404 (2013.01); F01N 2550/02 (2013.01); F01N 2900/0404 (2013.01); F01N 2900/08 (2013.01); F01N 2900/1411 (2013.01); F01N 2900/1616 (2013.01); F01N 2900/1812 (2013.01); Y02T 10/24 (2013.01); Y02T 10/47 (2013.01)

(58) Field of Classification Search
CPC .... F01N 11/00; F01N 3/2066; F01N 2550/02; F01N 2900/0404; F01N 2900/08; F01N 2900/1411; F01N 2900/1616; F01N 2900/1812; F01N 3/208; F01N 2610/02; F01N 2560/021; F01N 2560/026; F01N 2900/1402; F01N 9/005; B01D 53/9431; B01D 53/9495; B01D 2251/2062; B01D 2257/404; Y02T 10/24; Y02T 10/47
See application file for complete search history.

(56) References Cited

U.S. PATENT DOCUMENTS

| | | |
|---|---|---|
| 6,925,796 B2 | 8/2005 | Nieuwstadt et al. |
| 7,093,427 B2 | 8/2006 | Nieuwstadt et al. |
| 8,091,416 B2 | 1/2012 | Wang et al. |

(Continued)

FOREIGN PATENT DOCUMENTS

| | | |
|---|---|---|
| CN | 104234802 A | 12/2014 |
| KR | 20140137498 A | 12/2014 |

*Primary Examiner* — Walter L Lindsay, Jr.
*Assistant Examiner* — Geoffrey T Evans
(74) *Attorney, Agent, or Firm* — Eversheds Sutherland (US) LLP

(57) ABSTRACT

A fault detection method for a selective catalytic reduction (SCR) system comprising an SCR reactor, includes receiving a plurality of operating parameters (702) of the SCR reactor from a plurality of sensors. The method also includes estimating a state of an adaptive reactor model (704) representative of the SCR reactor based on the plurality of operating parameters. The method also includes generating a feature parameter (706) based on the plurality of operating parameters and the estimated state of the adaptive reactor model. The method includes determining a fault in the SCR system (708) based on the feature parameter.

15 Claims, 7 Drawing Sheets

(56) References Cited

U.S. PATENT DOCUMENTS

| | | |
|---|---|---|
| 8,353,202 B2 | 1/2013 | Thompson et al. |
| 8,499,545 B2 | 8/2013 | Busch et al. |
| 8,584,444 B2 | 11/2013 | Hoskin |
| 8,590,290 B2 | 11/2013 | Yezerets et al. |
| 8,596,045 B2 * | 12/2013 | Tuomivaara .......... F01N 13/009 60/295 |
| 8,813,479 B2 | 8/2014 | Geyer |
| 2010/0101214 A1 | 4/2010 | Herman et al. |
| 2012/0222401 A1 | 9/2012 | Scherer et al. |
| 2014/0144125 A1 | 5/2014 | Cavataio et al. |
| 2014/0360165 A1 | 12/2014 | Ardanese et al. |
| 2015/0033704 A1 | 2/2015 | Ardanese et al. |
| 2015/0113962 A1 * | 4/2015 | Devarakonda ............ F01N 3/18 60/286 |
| 2017/0009626 A1 * | 1/2017 | Hagiwara ............. F01N 3/2073 |
| 2017/0138244 A1 * | 5/2017 | Srinivasan ............. F01N 11/00 |
| 2017/0138285 A1 * | 5/2017 | Srinivasan ............. F01N 3/101 |

\* cited by examiner

SYSTEM AND METHOD FOR FAULT DIAGNOSIS IN EMISSION CONTROL SYSTEM

BACKGROUND

The invention relates generally to a technique for fault diagnosis in emission control systems, and more particularly to a technique for detecting faults in selective catalytic reduction units.

Industrial emissions such as nitrogen oxides and sulphur dioxide create environmental pollution. Environmental pollution is regulated in most industries. Stringent regulation requirements are being adopted by governments and standard bodies in order to minimize the discharge of noxious gases into the atmosphere by industrial facilities. Typically, an emission control system includes a reduction reactor where the industrial emanations are chemically treated with a reductant to reduce emissions. Specifically, a reductant such as ammonia is injected into the exhaust gas stream entering the reduction reactor to reduce emissions such as NOx from the exhaust gas stream.

Analysis and control of exhaust emissions is performed to comply with the regulation requirements. Emission analysis may be performed continuously by using a gas composition analyzer installed in the exhaust stack. Alternatively, the emission analysis may be performed using the gas composition analyzer connected to the exhaust stack through an extractive system. However, continuous analysis is expensive due to installation cost, maintenance and calibration requirements. A computer based model may be used to predict emissions such as nitrogen oxide (NOx) emission in order to reduce the cost of analysis of emissions. A number of predictive parameters associated with the fuel conversion process such as temperature and reductant coverage area are used by the computer based model to determine an estimate of the amount of the emissions.

Methodologies used in the past include nonlinear statistical, neural network, eigenvalue, stochastic, and other methods of processing the input parameters from available field devices and to predict process emission rates and combustion or process efficiency.

Emission control systems in power plants may experience deterioration in performance and develop faults during operation. Analysis based emission control techniques are not fully effective in the presence of faults. Knowledge of faults may be used in improvising the effectiveness of the emission control techniques. Detection of faults also helps in foreseeing failure of components and preparing for a planned maintenance schedule.

BRIEF DESCRIPTION

In accordance with one aspect of the present specification, a fault detection method for a selective catalytic reduction (SCR) system comprising an SCR reactor is disclosed. The method includes receiving a plurality of operating parameters of the SCR reactor from a plurality of sensors. The method further includes estimating a state of an adaptive reactor model representative of the SCR reactor based on the plurality of operating parameters. The method also includes generating a feature parameter based on the plurality of operating parameters and the estimated state of the adaptive reactor model. The method includes determining a fault in the SCR system based on the feature parameter.

In accordance with another aspect of the present specification, a fault diagnosis system for a SCR system is disclosed. The system includes a selective catalytic reduction (SCR) reactor and a signal acquisition unit. The system further includes a plurality of sensors for providing a plurality of operating parameters of the SCR reactor to the signal acquisition unit. The system also includes an emission control unit communicatively coupled to the signal acquisition unit and configured to estimate states of an adaptive reactor model representative of the SCR reactor based on the plurality of operating parameters. The system further includes a fault management unit coupled to the SCR reactor and the emission control unit and configured to generate a plurality of feature parameters based on the plurality of operating parameters and the adaptive reactor model. The fault management unit is also configured to determine a fault in the SCR system based on the plurality of feature parameters.

In accordance with another aspect of the present specification, a non-transitory computer readable medium having instructions is disclosed. The instructions enable at least one processor unit to receive a plurality of operating parameters regarding a selective catalytic reduction (SCR) reactor from a plurality of sensors. The instructions further enable the at least one processor to estimate states of an adaptive reactor model representative of the SCR reactor based on the plurality of operating parameters. The instructions also enable the at least one processor to generate a feature parameter based on the plurality of operating parameters and the adaptive reactor model. The instructions further enable the at least one processor to determine a fault in a SCR system based on the feature parameter.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

In certain embodiments, methods and systems for fault diagnosis of an emission control system include receiving a plurality of operating parameters from a selective catalytic reduction (SCR) reactor and determining an SCR model based on the plurality of operating parameters. A plurality of feature parameters characterizing a plurality of operational events of the SCR system is determined based on the plurality of operating parameters and the SCR model. In instances where one or more faults exist in the system, at least one of the one or more faults of the SCR system is determined based on the plurality of feature parameters.

The term "selective catalytic reduction (SCR) reactor" is used to refer to a unit used to reduce emissions from an industrial installation such as a power plant, an engine system, and a production facility. The terms 'SCR model' and the 'reactor model' are used equivalently and interchangeably to refer to a model representative of the SCR reactor. The term "emissions" refers to one or more of nitrogen oxide, nitrogen dioxide and used equivalently and interchangeably with NOx. The term "reductant" refers to a chemical such as ammonia used to reduce emissions from the industrial installation through a chemical reduction process. The term "emission control system" refers to a processor based hardware element capable of determining an amount of the reductant that is to be introduced into the SCR reactor for reducing the emissions from a power plant to a desirable level. The term "fault" refers to an operational defect in one or more subsystems or components of the SCR system.

Figure 1:
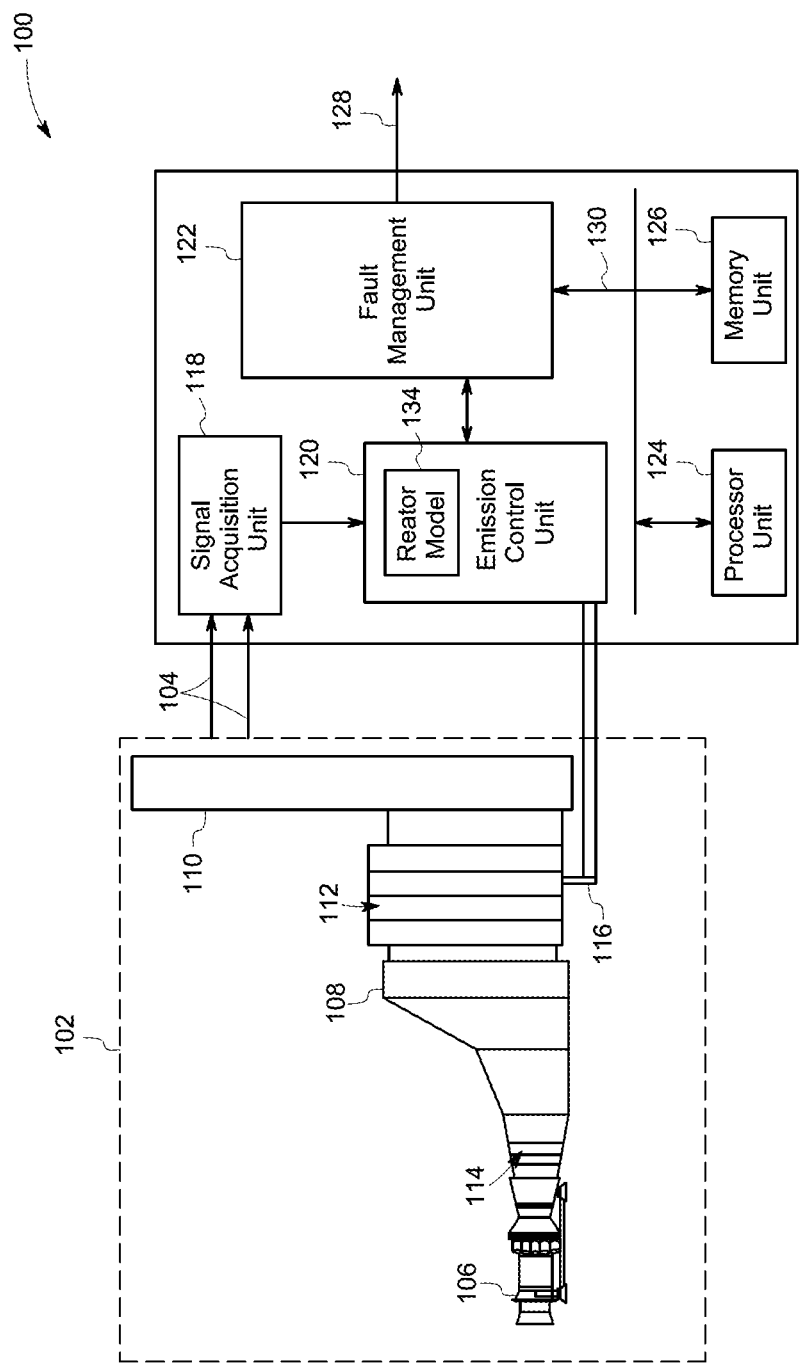
FIG. 1 is a diagrammatic illustration of a system for fault diagnosis in emission control system, in accordance with aspects of the present specification.

FIG. 1 illustrates a system 100 for fault diagnosis in a power plant equipped with an emission control system 102. The emission control system 102 includes a selective catalytic reduction (SCR) reactor 108 coupled to an exhaust outlet 106, such as a gas turbine exhaust configured to emanate an exhaust stream. The SCR reactor 108 includes an inlet 114, an outlet 110 and a catalyst 112 disposed inside the SCR reactor 108. The inlet 114 is configured to receive the exhaust stream of the gas turbine exhaust 106 and the outlet 110 is configured to release treated emissions to the atmosphere. The SCR reactor 108 also includes an injector 116 for introducing the reductant into the SCR reactor 108. The reductant interacts with the emissions in the presence of catalyst 112 to generate treated emissions to be released to the environment. The system 100 includes a signal acquisition unit 118, an emission control unit 120, and a fault management unit 122. The emission control unit 120 includes an adaptive reactor model 134. The system 100 also includes a processor unit 124 and a memory unit 126.

The signal acquisition unit 118 is communicatively coupled to the emission control system 102 and configured to obtain a plurality of operating parameters 104 of the emission control system 102. A plurality of sensors (not shown in FIG. 1) may be employed by the emission control system 102 to measure the plurality of operating parameters 104, for example. In one embodiment, the plurality of sensors is disposed at the inlet 114 of the SCR reactor 108 and the outlet 110 of the SCR reactor 108 for providing a plurality of operating parameters to the signal acquisition unit 118. In one embodiment, the plurality of parameters includes a plurality of inlet parameters of the SCR reactor 108, a plurality of outlet parameters of the SCR reactor 108, a reductant slip value acquired from the outlet 110, an emission value from the SCR reactor 108, and a flow parameter representative of a reductant inflow into the SCR reactor 108. The plurality of inlet parameters may include, but is not limited to, ammonia ($NH_3$), Oxygen ($O_2$), nitrogen monoxide (NO), nitrogen dioxide ($NO_2$). The plurality of outlet parameters may include, but is not limited to, a slip value and an emission value measured at the outlet 110 of the SCR reactor 108. The signal acquisition unit 118 may also be configured to retrieve a slip set-point from a predetermined memory location in the system 100. In one embodiment, the slip set-point is determined by offline experiments and is stored in the memory unit 126 that may be accessible by the signal acquisition unit 118. In one embodiment, the plurality of inlet parameters and the plurality of outlet parameters are obtained from Continuous Emission Monitoring System CEMS).

The emission control unit 120 is communicatively coupled to the signal acquisition unit 118 and configured to receive the plurality of operating parameters 104 from the signal acquisition unit 118. The emission control unit 120 is configured to estimate an adaptive reactor model 134 representative of the SCR reactor 108 based on the plurality of operating parameters. The adaptive reactor model 134 is configured to simulate chemical reactions of the SCR reactor and generate estimates of a plurality of operating parameters. In one embodiment, the adaptive reactor model 134 is a time-varying nonlinear model operating in a plurality of states. A state of the adaptive reactor model refers to a combination of operating parameters of the adaptive reactor model at a specific time instant. The estimation of the adaptive reactor model 134 by the emission control unit 120 includes determining one or more parameters of the adaptive reactor model 134 in real time. In one embodiment, estimating the adaptive reactor model 134 includes estimating states based on the plurality of operating parameters. In some embodiments, the emission control unit 120 is further configured to estimate a reductant flow set-point based on the adaptive reactor model 134 and the plurality of operating parameters. The reductant flow set point is provided to the injector 116 for controlling the flow of the reductant into the SCR reactor 108. By way of example, the reductant flow set point may be provided to the injector 116 using automatic control by the emission control unit 120 or manual control to facilitate reduction of emanations from the outlet 110 of the SCR reactor 108. In case of the manual control, an operator may manually set a reductant valve to facilitate reduction of emanations from the outlet 110 of the SCR reactor 108. The emission control unit 120 may be used by the operator in estimating the reductant flow set-point retrieved by a memory location.

In one embodiment, the adaptive reactor model 134 includes a time-varying mathematical model for the SCR reactor. In another embodiment, the adaptive reactor model 134 is based on a dynamic response of at least one of the plurality of sensors. As an example, the time-varying mathematical model includes an extended Kalman filter (EKF). In another example, the time-varying mathematical model may include other filtering techniques based on filters such as Kalman filter and its variants such as unscented Kalman filter (UKF). The time-varying mathematical model is configured to adaptively estimate states of the adaptive reactor model in real time.

The adaptive reactor model 134 may include electronics (hardware and/or software) capable of performing operations including but not limited to signal decoding and/or delay insertion. In a non-limiting example, to aid in the above mentioned operations, the adaptive reactor model 134 may include a microprocessor, memory, or combinations thereof. The microprocessor may include a reduced instruction set computing (RISC) architecture type microprocessor or a complex instruction set computing (CISC) architecture type microprocessor. Further, the microprocessor may be of a single-core type or multi-core type.

The fault management unit 122 is coupled to the emission control unit 120 and configured to detect a fault of the SCR reactor 108. In embodiments where one or more faults are detected, the fault management unit 122 may provide suggestions to an operator for managing and correcting the faults. Further, the fault management unit 122 is configured to estimate a symptomatic parameter corresponding to a subsystem of the emission control system 102 based on the reactor model 134 and a plurality of operating parameters. In one embodiment, the symptomatic parameter includes at least one of the emission offset and a reductant slip offset parameter. The term "emission offset" refers to a difference between the emission values from the outlet 110 and an estimate of the emission value from the SCR model. Similarly, the term "reductant slip offset" refers to a difference between the reductant flow set point value and the actual reductant flow measured by a sensor. It should be noted herein that the symptomatic parameter may also include one of the plurality of operating parameters. The fault management unit 122 is also configured to determine a plurality of feature parameters corresponding to at least one subsystem of the emission control system 102 based on the symptomatic parameter and the plurality of operating parameters. The at least one subsystem of the emission control system 102 may include at least one of an injection grid subsystem, a reactor inlet subsystem, a reactor catalyst subsystem, a reactor subsystem, a reactor stack subsystem, and a Heat Recovery Steam Generator (HRSG) stack subsystem. The plurality of feature parameters may be used to identify operational events of the SCR reactor 108. The plurality of feature parameters comprises characteristic parameters capable of determining a plurality of events during the operation of the emission system and may include, for example at least one of an airflow offset, a reductant flow offset, a reductant valve offset, an inlet emission offset, an outlet emission offset, and a slip offset value.

The plurality of feature parameters is related to at least one of the subsystems. The operational events determined based on the plurality of feature parameters are indicative of an operational state of an associated subsystem. Further, the operational events may be used by the fault measurement unit 122 to generate a fault indicator 128. As an example, a flow sensor fault is determined by detecting an operational event, such as a reductant flow event. Further, the reductant flow event in turn is determined based on the feature parameter, such as the reductant flow offset. The plurality of faults detected by the exemplary techniques disclosed herein includes, but is not limited to, a blower fan fault, a flow sensor fault, a flow valve fault, an inlet sensor fault, a stack sensor fault, a slip sensor fault, and a catalyst fault.

In the system 100, the processor unit 124 is communicatively coupled to the communication bus 130 and may include at least one arithmetic logic unit, a microprocessor, a general purpose controller, or a processor array to perform the desired computations or run the computer program. In one embodiment, the functionality of the processor unit 124 may be limited to tasks performed by the signal acquisition unit 118. In another embodiment, the functionality of the processor unit 124 may be based on the functions performed by the emission control unit 120. In yet another embodiment, the functionality of the processor unit 124 may be based on the functions performed by the fault management unit 122. The processor unit 124 may be configured to provide the functionality of one or more of the signal acquisition unit 118, the emission control unit 120, and the fault management unit 122. While the processor unit 124 is shown as a single unit, it may be noted that the processor unit 124 may be present in the system 100 as two or more units, where each unit of the two or more units may include one or more processors that are configured to provide the functionality of one or more of the signal acquisition unit 118, the emission control unit 120, and the fault management unit 122.

Further, the memory unit 126 of the system 100 is communicatively coupled to the processor unit 124 and is configured to be accessed by at least one processor residing in at least one of the units 118, 120 and 122. In an exemplary embodiment, the memory unit 126 may refer to one or more memory modules. The memory unit 126 may be a non-transitory storage medium. For example, the memory unit 126 may be a dynamic random access memory (DRAM) device, a static random access memory (SRAM) device, flash memory or other memory devices. In one embodiment, the memory may include a non-volatile memory or similar permanent storage device, media such as a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or other non-volatile storage devices. In one specific embodiment, a non-transitory computer readable medium may be encoded with a program having instructions to instruct at least one processor to perform functions of one or more of the signal acquisition unit 118, the emission control unit 120, and the fault management unit 122.

Figure 2:
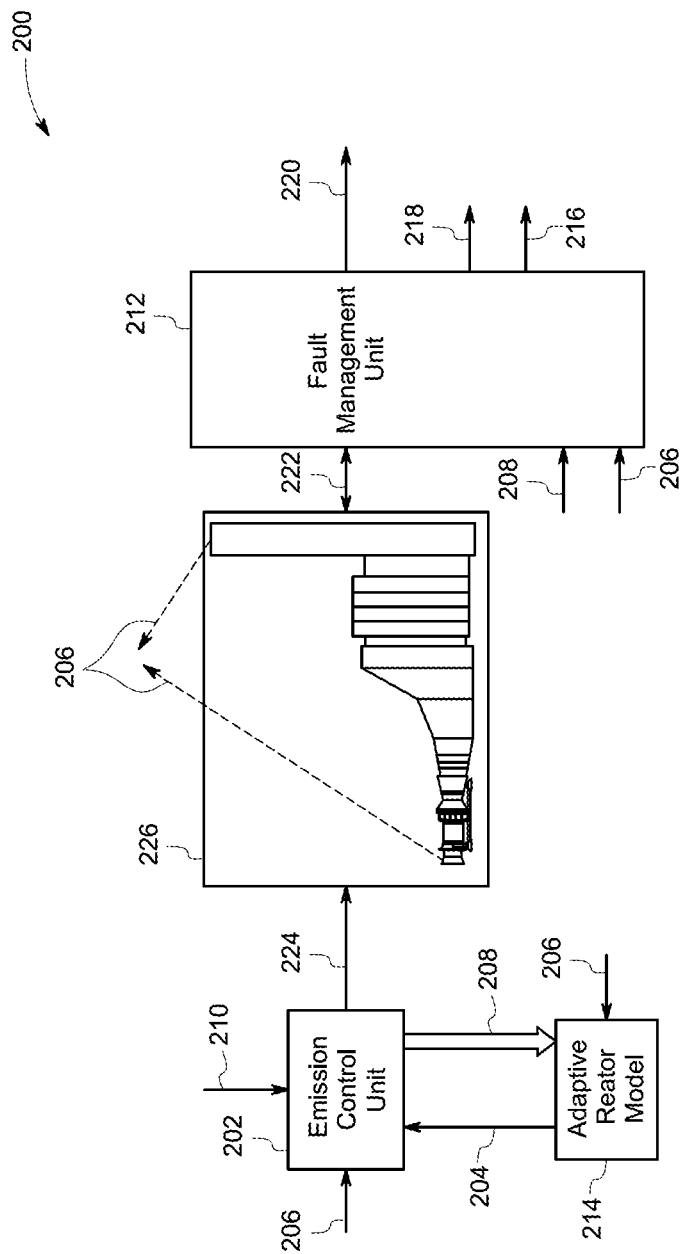
FIG. 2 is a signal flow diagram for the system of FIG. 1, in accordance with aspects of the present specification.

FIG. 2 illustrates a signal flow diagram 200 for the fault diagnosis system 100 of FIG. 1. The signal flow diagram 200 includes an SCR system 226 having a gas turbine inlet, an exhaust outlet, and a SCR reactor in between the inlet and the outlet. Emissions from the SCR system are monitored and controlled by an emission control unit 202 having an adaptive reactor model 214 representative of the SCR reactor. A fault management unit 212 is communicatively coupled to the emission control unit and the SCR system 226 and configured to determine a plurality of faults 220.

A plurality of sensors are disposed in the SCR system 226 and configured to measure a plurality of operating parameters 206. The plurality of operating parameters 206 typically includes a plurality of inlet parameters measured at the inlet of the SCR system 226 and also a plurality of outlet parameters measured at the exhaust of the SCR system 226. The plurality of operating parameters 206 may be used by the emission control unit 202, the adaptive reactor model 214, and/or the fault management unit 212. The emission control unit 202 is also configured to receive a feedforward signal 204 representative of an estimate of residual reductant in the SCR reactor and a feedback signal 210 representative of the reductant slip value from the exhaust of the SCR system 226. The emission control unit 202 is also configured to receive estimates of the plurality of operating parameters from the adaptive reactor model 214. The emission control unit 202 is configured to estimate states 208 of the SCR reactor. Further, the emission control unit 202 is also configured to estimate a reductant flow set-point 224 to be provided to an injection subsystem of the SCR system 226. In one embodiment, the reductant set point 224 is determined based on the feedforward signal 204 and the feedback signal 210. In one embodiment, an extended Kalman filter is used to determine the states 208 of the SCR reactor model. In one embodiment, estimates of plurality of operating parameters of the SCR system 226 is obtained from the adaptive reactor model 214.

The fault management unit 212 is configured to receive the plurality of operating parameters 206 and the states 208 of the adaptive reactor model. The fault management unit 212 is also configured to exchange fault related information 222 with the SCR reactor 226. The fault management unit 212 is configured to generate a plurality of symptomatic parameters 216 based on the plurality of parameters 206. The fault management unit 212 is further configured to generate a plurality of feature parameters 218 based on the plurality of symptomatic parameters 216. The fault management unit 212 is further configured to determine a plurality of events representative of a plurality of faults 220 based on the plurality of symptomatic parameters 216 and the plurality of feature parameters 218.

Figure 3:
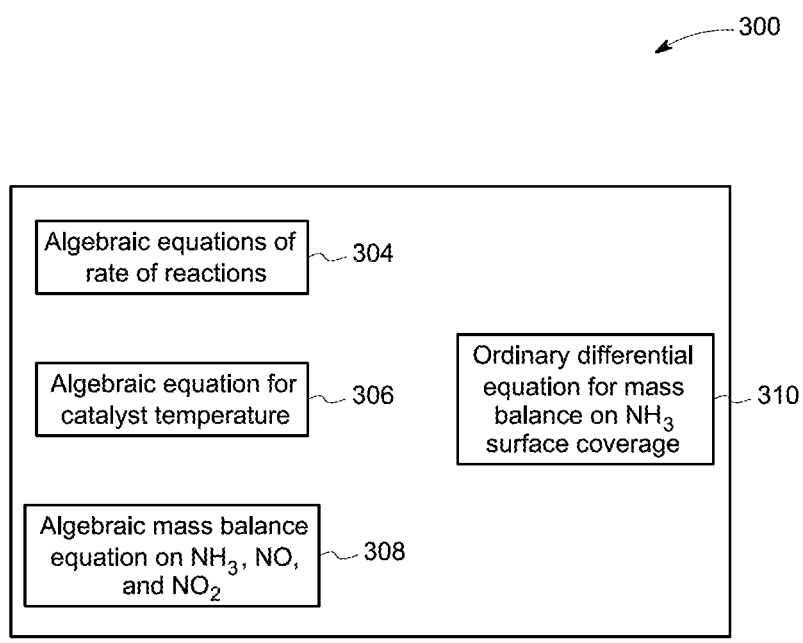
FIG. 3 is a block diagram illustrating components of a selective catalytic reduction (SCR) model, in accordance with aspects of the present specification.

FIG. 3 is a block diagram illustrating components of a mathematical model 300 for a SCR model located in the emission control unit 120 of FIG. 1. The mathematical model 300 is a kinetic model representative of chemical reactions that take place in the SCR unit. In the SCR unit, ammonia is injected from the injector into the exhaust gas stream and may react, in the presence of the catalyst, with NOx to produce nitrogen ($N_2$) and water ($H_2O$). The chemical reactions include, but are not limited to, ammonia adsorption and desorption reaction with the catalyst, ammonia oxidation reaction, standard SCR reaction, fast SCR reaction, $NO_2$ SCR reaction, and NO oxidation reaction. The mathematical model 300 includes a set of algebraic equations 304, 306, 308 and a set of ordinary differential equations 310 characterizing reactions within the SCR reactor. The set of algebraic equations includes a plurality of rate equations 304 describing characteristics of the individual reactions such as concentration change of each chemical reactant or product. The set of algebraic equations also include equations for catalyst temperature 306, mass balance equation on ammonia, nitrogen oxide, and nitrogen dioxide 308. The set of ordinary differential equations 310 include equations for mass balance on ammonia surface coverage. The SCR model includes a plurality of parameters such as chemical composition and concentration of each chemical reactant or product and the coverage ratio of ammonia on the catalyst. The coverage ratio of ammonia on the catalyst may further depend at least on the characteristics of the catalyst, such as chemical composition, catalyst substrate, physical geometry, and the time of usage.

Figure 4:
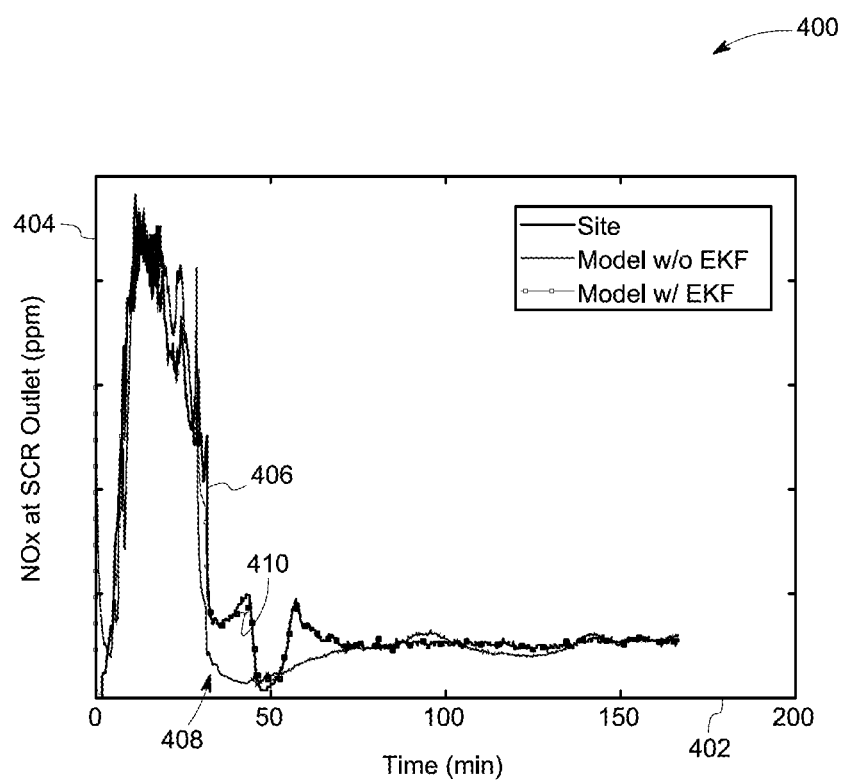
FIG. 4 is a graph illustrating performance of an embodiment for estimating the SCR model, in accordance with aspects of the present specification.

FIG. 4 is a graph 400 illustrating the performance of a technique for estimating the SCR model. The graph 400 includes an x-axis 402 representative of time in minutes and a y-axis 404 representative of emissions at SCR outlet in parts per million. Curves 406, 408, 410 are representative of emission values obtained from the SCR unit, and corresponding estimates obtained from two different models respectively. The curve 406 represents measurements of emissions at outlet of the SCR unit. The curve 408 is representative of estimates of the emissions obtained from a SCR model without any state estimation technique. The curve 410 is representative of estimates of the emissions obtained from the SCR model using an extended Kalman filter. It may be observed that the curves 408 and 410 match closely compared to the curve 406.

Figure 5:
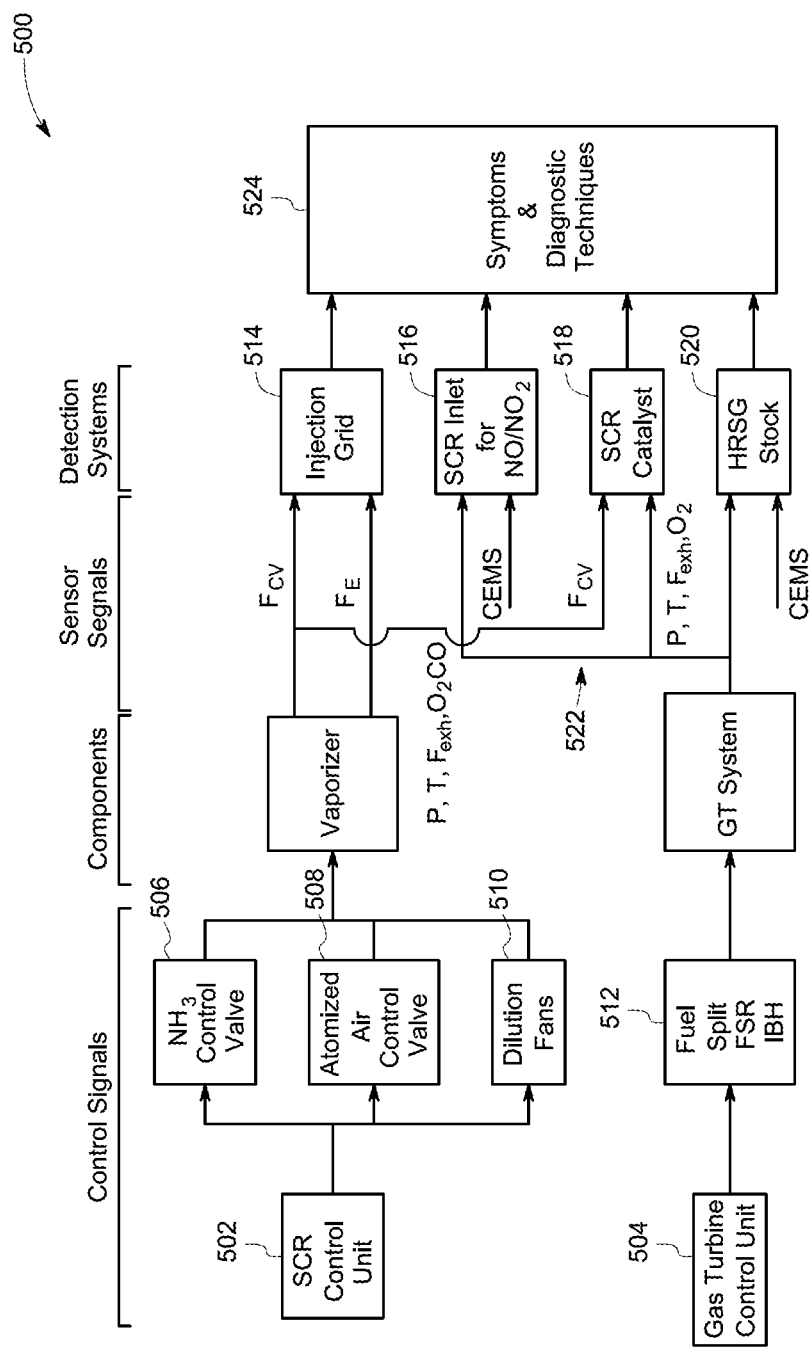
FIG. 5 illustrates an exemplary architecture for fault diagnosis in an emission control system, in accordance with aspects of the present specification.

FIG. 5 illustrates architecture 500 for fault diagnosis in an emission control system, such as the emission control unit 120 of FIG. 1. The architecture 500 includes two categories of control units, namely a SCR control unit 502 and a gas turbine control unit 504, corresponding to the SCR unit and an exhaust generator (such as a gas turbine), respectively. The SCR control unit 502 includes ammonia control valve 506, an atomized air control valve 508, and dilution fans 510 controlling the operation of a vaporizer that feeds the reductant flow to the injection grid 514. The gas turbine control unit 504 includes mechanisms for fuel split, a fuel stroke reference (FSR) position, and an inlet bleed heating system (IBH) controlling the operation of the gas turbine (GT) system 512. The plurality of sensors includes, but is not limited to, a reductant flow sensor measuring reductant flow into the SCR reactor, SCR inlet sensor for measuring inlet emissions, emission sensor for measuring emission from the outlet, and a slip sensor measuring the residual reductant from the outlet of the SCR system.

A plurality of operating parameters 522 include, but is not limited to, FCV (Flow Control Valve—Position), $F_E$ (Flow Element—Flow through Control Valve), P (Pressure), T (Temperature). $F_{exh}$ (Flow from gas turbine exhaust), $O_2$ (Oxygen Percentage), CO (Carbon Monoxide—ppm), measurements of NO, $NO_2$ and NH3 obtained from the CEMS (Continuous Emission Monitoring System). The plurality of operating parameters 522 may be used to detect one or more symptomatic parameters that are indicative of a fault in the emission control system. The emission control system includes a plurality of subsystems such as the injection grid 514, a SCR inlet 516, a SCR catalyst 518, and a HRSG 520. The fault diagnosis architecture 500 includes a plurality of techniques 524 for determining at least one event associated with one or more of the subsystems 514, 516, 518, and 520. The at least one event is determined based on one or more symptomatic parameters. A fault condition of the emission control system, associated with a particular subsystem may be determined based on the one or more symptomatic parameters and at least one of the detected events.

Figure 6:
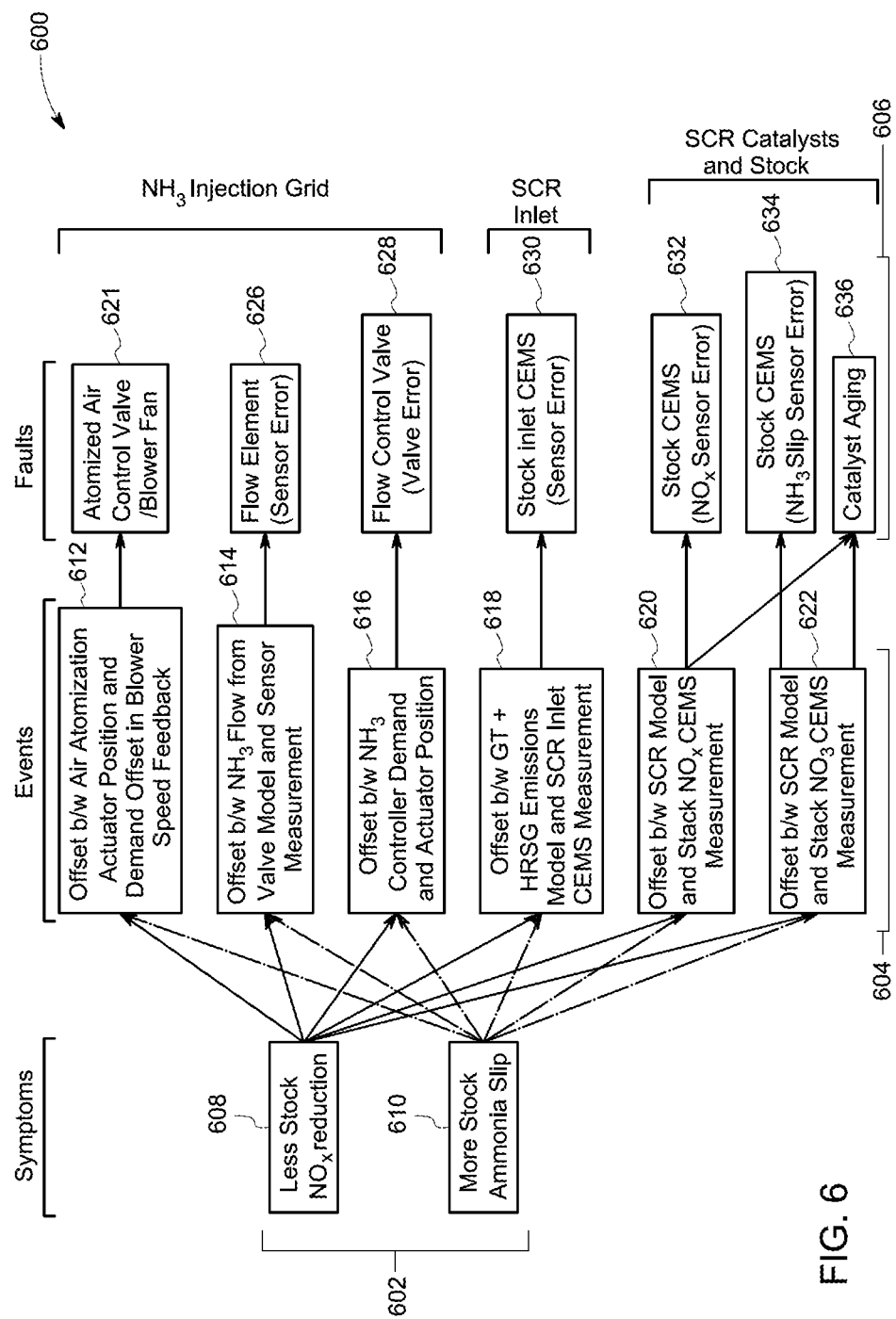
FIG. 6 is a block diagram illustrating symptomatic parameters, events and faults in a SCR system and their interrelationships, in accordance with aspects of the present specification.

FIG. 6 is a block diagram 600 illustrating a relationship between a plurality of symptomatic parameters 602 indicative of symptoms of one or more faults in the emission control system, a plurality of events 604 associated with faults, and a plurality of faults 606 associated with specific subsystems in a SCR emission control system. In an exemplary embodiment, the plurality of symptomatic parameters include, but are not limited to, a decreased stack emission reduction 608, and an increased stack ammonia slip value 610. A plurality of offset values is determined based on the plurality of operating parameters in each of the subsystems. For example, corresponding to the injection grid subsystem, an air atomization offset, a blower speed offset, a reductant flow offset, and a reductant valve offset may be determined based on the operating parameters. In another example, an inlet emission offset may be determined corresponding to the SCR inlet subsystem. In another example, an outlet emission offset, and a slip offset may be determined based on the plurality of operating parameters corresponding to the SCR catalyst subsystem and SCR stack subsystem.

The air atomization offset refers to an offset between actual and desired positions of an air atomization actuator. The blower speed offset refers to a difference between an actual blower speed and a desirable blower speed. The term "reductant flow offset" refers to a difference between an actual reductant flow measured from a reductant sensor and an estimate of the required reductant flow as estimated by the emission control unit 120 of FIG. 1. The term "reductant valve offset" refers to a difference between a reductant demand estimated by the SCR model and the actual reductant flow determined based on a flow valve position. The term "inlet emission offset" refers to a difference between an emission estimate corresponding to a gas turbine and a HRSG based on a gas turbine model and actual measurements of emissions provided to the SCR inlet by the exhaust outlet 106. The term "outlet emission offset" refers to a difference between emissions estimated by the SCR model and emissions measured at the outlet of the SCR unit. The terms "outlet emission offset" and "emission offset" are used interchangeably and equivalently in this specification. The term "slip offset value" refers to a difference between a slip value estimated by the SCR model and the measured slip value.

A plurality of events indicative of a plurality of faults associated with the emission control system may be determined based on the plurality of offset values. A plurality of threshold values are used with the plurality of offset values to determine the plurality of faults. In a first step, when an offset value exceeds a corresponding predetermined threshold value, a corresponding event is detected. Further, when the corresponding event is detected, a fault associated with the detected event is identified as being present in the emission control system. The plurality of events associated with the plurality of subsystems include, but are not limited to, air atomization event and a blower speed event 612, a reductant flow event 614, a reductant demand event 616, an inlet emission event 618, an outlet emission event 620, and a slip offset event 622. The plurality of faults determined by an exemplary technique includes, but are not limited to, air atomization control valve fault (and a blower fan fault) 624, a flow sensor fault 626, a flow valve fault 628, an inlet sensor fault 630, a stack sensor fault 632, a slip sensor fault 634, and a catalyst fault 636.

In one example, one or more faults associated with the injection grid subsystem are determined. By way of example, when the air atomization offset value exceeds an atomization threshold value, an air atomization event is detected and a fault in control valve used for air atomization is detected. In another example, when the blower speed offset exceeds a blower offset threshold value, a blower speed event is detected and a blower fan fault is detected. When the reductant flow offset value exceeds a reductant flow threshold value, the reductant flow event is detected and a flow sensor fault is detected. When the reductant valve offset exceeds a reductant valve threshold value, the reductant demand event is detected and a flow control valve fault is detected.

In another example, faults associated with the SCR inlet subsystem are determined. Specifically, when an inlet emission offset exceeds an inlet emission threshold value, the inlet emission event is detected and an SCR inlet sensor fault is detected. Further, in one example, one or more of faults associated with the SCR catalyst subsystem are determined. Specifically, when the slip offset exceeds a slip threshold value, a slip event is detected and a slip sensor fault is detected. When the outlet emission offset exceeds an outlet emission threshold value, an outlet emission event is detected and an emission sensor fault is detected. If the slip event and the outlet emission events are simultaneously detected, catalyst fault is detected.

In one embodiment, the plurality of threshold values such as the atomization threshold value, the blower offset threshold value, the reductant flow threshold value, the reductant valve threshold value, the inlet emission threshold value, the slip threshold value, and the outlet emission threshold value are determined apriori and stored in memory locations. In another embodiment, the plurality of threshold values may be provided by an operator of the system. In one embodiment, rate of change of offset values are also used in determining the plurality of faults. In another embodiment, a time duration for which one of a plurality of thresholds exceed a corresponding offset value is used for determining a fault condition. In one embodiment, the catalyst fault is detected using additional values of slip threshold value and outlet emission threshold values.

Figure 7:
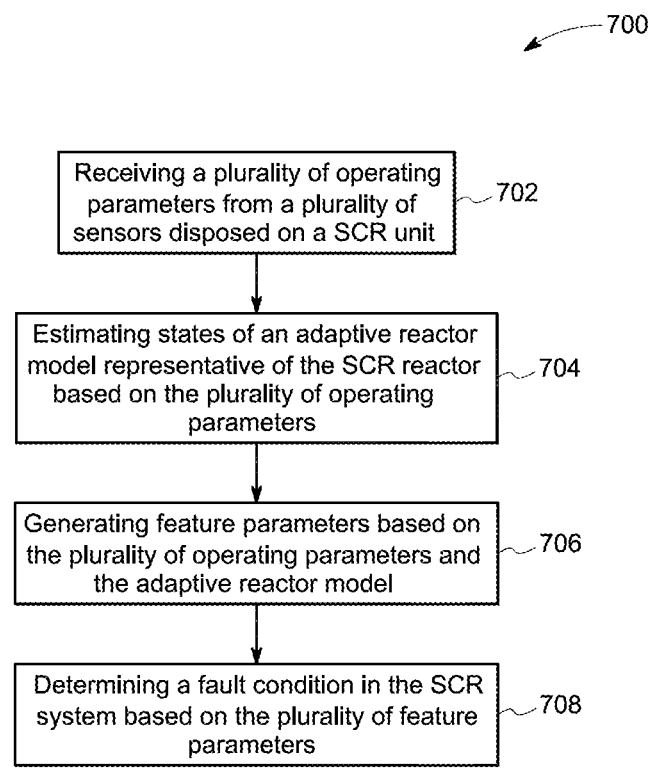
FIG. 7 is a flow chart of an exemplary method for fault diagnosis in an emission control system, in accordance with aspects of the present specification.

FIG. 7 is a flow chart 700 illustrating steps of a method for fault diagnosis in emission control system. The method includes receiving a plurality of operating parameters from a plurality of sensors disposed in inlet of a SCR unit in step 702. The sensors in the plurality of sensors include, but are not limited to, a reductant flow sensor, a SCR inlet sensor, an emission sensor, a slip sensor, or combinations thereof. The plurality of operating parameters include a plurality of inlet parameters such as reductant flow rate, a plurality of outlet parameters such as emission from the exhaust, and other parameters such as pressure, temperature, oxygen, flow reading from flow control value, FCV, FE, P, T. Fexh, $O_2$, CO, measurements of NO, $NO_2$ and $NH_3$ obtained from the CEMS. At step 704, the method further includes estimating an adaptive reactor model representative of the SCR reactor based on the plurality of operating parameters. The adaptive reactor model is based on a set of mathematical equations representative of chemical reactions within the SCR unit. A state estimation technique such as extended Kalman filter (EKF) is used to update the adaptive reactor model in real time. At step 706, a plurality of estimated operating parameters is determined based on the adaptive reactor model. Further, a plurality of offset values are determined based on the plurality of estimated operating parameters. At step 708, a fault of the emission control system is determined based on the offset value and the adaptive reactor model.

As an example, a reductant slip offset parameter is compared with a reductant slip threshold value to detect a symptom of a fault. When the symptom of a fault is detected, a plurality of offset values related to the plurality of subsystems of the SCR reactor are determined and compared with respective offset threshold values. If air atomization offset value exceeds an atomization threshold value, an air atomization event is detected and a fault in control valve used for air atomization is detected.

It is to be understood that not necessarily all such objects or advantages described above may be achieved in accordance with any particular embodiment. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

While the technology has been described in detail in connection with only a limited number of embodiments, it should be readily understood that the specification is not limited to such disclosed embodiments. Rather, the technology can be modified to incorporate any number of variations, alterations, substitutions or equivalent arrangements not heretofore described, but which are commensurate with the spirit and scope of the claims. Additionally, while various embodiments of the technology have been described, it is to be understood that aspects of the specification may include only some of the described embodiments. Accordingly, the specification is not to be seen as limited by the foregoing description, but is only limited by the scope of the appended claims.

The invention claimed is:

1. A fault detection method for a selective catalytic reduction (SCR) system comprising an SCR reactor, the method comprising:
   receiving a plurality of operating parameters of the SCR reactor from a plurality of physical sensors;
   estimating a state of an adaptive reactor model representative of the SCR reactor based on the plurality of operating parameters, wherein the adaptive reactor model includes a time-varying mathematical model for the SCR reactor;

generating a plurality of feature parameters based on the plurality of operating parameters and the estimated state of the adaptive reactor model, wherein a first feature parameter of the plurality of feature parameters corresponds to an outlet emission offset, and a second feature parameter of the plurality of feature parameters corresponds to at least one of an airflow offset, a reductant flow offset, a reductant valve offset, an inlet emission offset, or a slip offset value; and determining a fault in the SCR system based on the plurality of feature parameters.

2. The method of claim 1, wherein the plurality of operating parameters comprises one or more of a plurality of inlet parameters, a plurality of outlet parameters, a reductant slip value, an emission value, and a flow parameter.

3. The method of claim 1, wherein the estimating comprises determining estimates of states of the adaptive reactor model using extended Kalman filtering.

4. The method of claim 1, wherein determining the fault comprises:

estimating a symptomatic parameter corresponding to a subsystem of the SCR system using the adaptive reactor model using the plurality of operating parameters; and determining the feature parameter corresponding to the subsystem based on the symptomatic parameter and the plurality of operating parameters.

5. The method of claim 4, wherein the symptomatic parameter comprises at least one of an emission offset parameter and a reductant slip offset parameter.

6. The method of claim 4, wherein the subsystem comprises at least one of an injection grid subsystem, a reactor inlet subsystem, reactor subsystem and a reactor stack subsystem.

7. The method of claim 1, wherein the fault comprises at least one of a blower fan fault, a flow sensor fault, a flow valve fault, an inlet sensor fault, a stack sensor fault, a slip sensor fault, and a catalyst fault.

8. A fault diagnosis system for a SCR system, comprising:
a selective catalytic reduction (SCR) reactor;
a signal acquisition unit;
a plurality of physical sensors for providing a plurality of operating parameters of the SCR reactor to the signal acquisition unit;
an emission control unit communicatively coupled to the signal acquisition unit and configured to estimate states of an adaptive reactor model representative of the SCR reactor based on the plurality of operating parameters, wherein the adaptive reactor model uses a time-varying mathematical model for the SCR reactor;
a fault management unit coupled to the SCR reactor and the emission control unit and configured to:
generate a plurality of feature parameters based on the plurality of operating parameters and the adaptive reactor model, wherein a first feature parameter of the plurality of feature parameters corresponds to an outlet emission offset, and a second feature parameter of the plurality of feature parameters corresponds to at least one of an airflow offset, a reductant flow offset, a reductant valve offset, an inlet emission offset, or a slip offset value; and determine a fault in the SCR system based on the plurality of feature parameters.

9. The system of claim 8, wherein the plurality of physical sensors are configured to measure a plurality of inlet parameters, a plurality of outlet parameters, a reductant slip value, an emission value and a flow parameter.

10. The system of claim 8, wherein the emission control unit is configured to determine estimates of states of the adaptive reactor model using extended Kalman filter (EKF).

11. The system of claim 8, wherein the fault management unit is configured to:

estimate a symptomatic parameter corresponding to a subsystem of the SCR system using the adaptive reactor model using the plurality of operating parameters; and determine a feature parameter corresponding to the subsystem based on the symptomatic parameter and the plurality of operating parameters.

12. The system of claim 11, wherein the fault management unit is configured to determine at least one of an emission offset parameter and a reductant slip offset parameter.

13. The system of claim 11, wherein the fault management unit is configured to determine at least one of a fault in at least one of an injection grid subsystem, a reactor inlet subsystem, reactor subsystem and a reactor stack subsystem.

14. The system of claim 8, wherein the fault management unit is configured to determine at least one of a plurality of faults comprising a blower fan fault, a flow sensor fault, a flow valve fault, an inlet sensor fault, a stack sensor fault, a slip sensor fault, and a catalyst fault.

15. A non-transitory computer readable medium having instructions to enable at least one processor unit to:

receive a plurality of operating parameters regarding a selective catalytic reduction (SCR) reactor from a plurality of physical sensors;

estimate states of an adaptive reactor model representative of the SCR reactor based on the plurality of operating parameters, wherein the adaptive reactor model includes a time-varying mathematical model for the SCR reactor;

generate a plurality of feature parameters based on the plurality of operating parameters and the adaptive reactor model, wherein a first feature parameter of the plurality of feature parameters corresponds to an outlet emission offset, and a second feature parameter of the plurality of feature parameters corresponds to at least one of an airflow offset, a reductant flow offset, a reductant valve offset, an inlet emission offset, or a slip offset value; and determine a fault in a SCR system based on the plurality of feature parameters.

* * * * *